April 29, 1969 D. T. ANDERSON 3,441,868

AMPLIFIER WITH HUM ELIMINATING CIRCUIT

Filed Aug. 16, 1967

INVENTOR.
DEAN T. ANDERSON
BY Moody and Phillion
ATTORNEYS

United States Patent Office 3,441,868

Patented Apr. 29, 1969

3,441,868

AMPLIFIER WITH HUM ELIMINATING CIRCUIT

Dean T. Anderson, Marion, Iowa, assignor to Collins Radio Company, Cedar Rapids, Iowa, a corporation of Iowa Filed Aug. 16, 1967, Ser. No. 661,103
Int. Cl. H03f *1/26, 1/30*
U.S. Cl. 330—149 1 Claim

ABSTRACT OF THE DISCLOSURE

A circuit for eliminating hum in a transistorized amplifier employing a hum containing D-C source with said hum being supplied to the transistor collector along with the D-C signal. A portion of the hum is also supplied to the transistor base electrode with a magnitude sufficient to produce at said collector electrode a hum component equal, but opposite in phase, to the hum supplied directly thereto from the D-C source, thus effectively canceling said hum.

This invention relates generally to noise suppression circuits and, more particularly, to a circuit for eliminating hum in the D-C voltage source of a circuit, such as an amplifier.

In most types of electronic gear the original power source is A-C in nature. Such A-C power is rectified to form a D-C power supply which, in turn, is employed to supply the ncessary D-C voltage requirements of the system. It is desirable that the A-C ripple in the D-C voltage source be minimized. Elimination of ripple in a D-C source has been the subject of much development and there exists many rectifier circuits and filter circuits designed to reduce A-C ripple. Usually, the cost of such filter circuits increases with the degree of ripple minimization desired. Also, the space requirements of a power source ordinarily increases with the complexity thereof. In certain applications, such as airborne electronic gear space is at a premium and it is desirable that the power source be as compact as possible.

It is the primary object of the invention to eliminate the effect of hum which exists in the D-C power supply after such hum has been introduced into the circuit powered by the D-C source.

A second object of the invention is the elimination of the necessity for expensive and space-consuming filters in the D-C power supply.

A third purpose of the invention is the elimination of hum in an amplifier where the source of such hum is in the D-C power supply.

A fourth aim of the invention is the improvement of D-C power supply hum eliminating circuits generally.

In one preferred form the invention is embodied in a conventional amplifier comprising a transistor with a D-C power supply having objectional hum therein applied across the collector-emitter electrodes of said transistor through suitable collector and emitter resistors. A voltage divider consisting of first and second resistors is also connected across the D-C power source with a tap therein connected to the base of the transistor, and thereby providing suitable bias to said base. The hum in the D-C power source is introduced in the collector output of the transistor through the collector load resistor and has a given phase. The essence of the invention comprises a capacitor means connected across a portion of said first resistor, thereby introducing an attenuated form of the hum to the base of said transistor, and having the same phase as the hum signal supplied to the collector of the transistor. The attenuated hum signal supplied to the transistor base appears at the transistor collector in an inverted form to oppose the hum supplied directly through said collector resistor. Attenuation of the hum signal supplied to the transistor base is of the proper magnitude so that the amplitude of the inverted hum signal on the transistor collector is substantially equal to the amplitude of the hum signal supplied directly through the collector resistor, thereby effecting a substantially complete cancellation of the hum signal in the output circuit.

The above-mentioned and other objects and features of the invention will be more fully understood from the following detailed description thereof when read in conjunction with the drawings in which.

Figure 1:
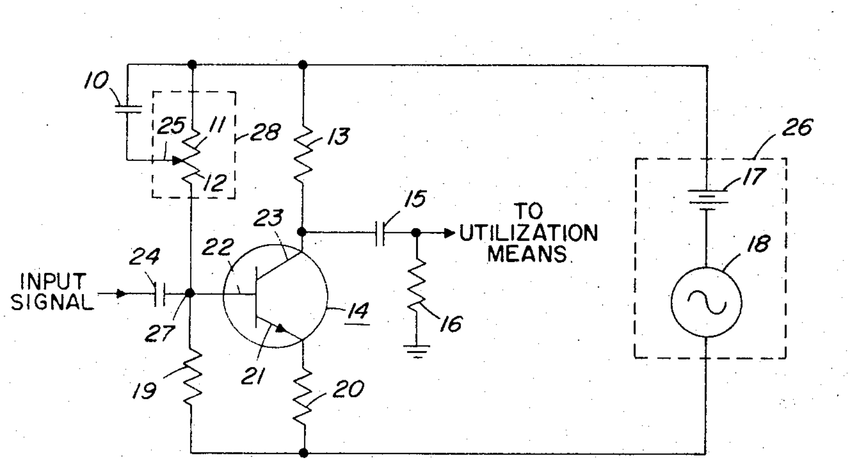
FIG. 1 is a schematic sketch of the invention.

Referring now to the drawing, a D-C voltage source 26 comprised of a D-C voltage component designated by battery 17 with an A-C ripple thereon represented by A-C source 18, is supplied across a series combination of collector electrode resistor 13, transistor 14, and emitter resistor 20. The D-C bias for base 22 of transistor 14 is obtained by means of a voltage divider comprised of resistors 11, 12 and 19 with a tap 27 therebetween which is connected to base 22. Further, an input signal is supplied to the base 22 through coupling capacitor 24. In the particular circuit of FIG. 1 the output signal of the amplifier is taken from collector 23 of the transistor through coupling capacitor 16 and across load resistor 15.

Figure 2:
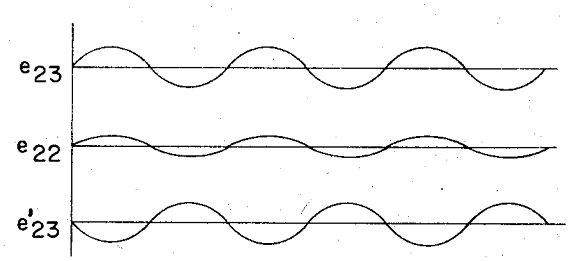
FIG. 2 is a group of waveforms showing the A-C ripple at various points in the circuit of FIG. 1.

The A-C ripple generated in D-C source 26 is represented by the waveform $e_{23}$ of FIG. 2. More specifically, that portion of the ripple which is supplied to collector electrode 23 through resistor 13 from source 26 is represented by the waveform $e_{23}$ in FIG. 2. Such ripple is then passed through capacitor 15 and across load resistor 16 as an undesirable distortion of the signal.

To compensate for such ripple, there is provided capacitor 10 which is connected to the tap 25 of voltage divider 28 so that the A-C ripple component of the source is attenuated by resistor 12 of voltage divider 28 and is then supplied in its attenuated form to base 22. Such attenuated ripple is represented by waveform $e_{22}$ of FIG. 2.

The degree of attenuation is such that after amplification of the signal $e_{22}$ by transistor 14, the amplitude thereof will be equal to the amplitude of the ripple supplied through collector resistor 13. Further, since transistor 14 functions to invert the phase of the attenuated ripple supplied to base 22, the resulting amplified ripple appearing at collector 23, and represented by waveform $e'_{23}$ of FIG. 2, is not only equal in amplitude to the ripple supplied through collector electrode 13 but is also opposite in phase thereto so that the two ripple signals cancel out.

It is to be understood that the form of the invention shown and described herein is but one embodiment thereof and can be utilized with many different types of circuits which perform amplifying functions without departing from the spirit or scope thereof.

I claim:

1. In a system comprising:

rectifying means for producing a direct current voltage source from an alternating current voltage source where said direct current voltage source has a ripple component therein; and an amplifier means comprising:

electron valve means having an electron emitting electrode, an electron collecting electrode, and an electron control electrode;

first impedance means connecting said direct current voltage source to said electron collecting electrode;

second impedance means connecting said direct current voltage source to said electron emitting source; and third impedance means having first and second taps therein and connected across said direct current voltage source with said first tap connected to said electron control electrode to supply a biasing potential thereto;

ripple component eliminating means comprising capacitive impedance means connecting said direct current voltage source to said second tap;

said capacitive impedance means and the portion of said third impedance means between said second tap and said electron control electrode constructed to supply to said electron control electrode an attenuated form of said ripple component of a magnitude to produce at said electron collecting electrode a form of said ripple component substantially equal in amplitude but opposite in phase to the ripple component supplied to said electron collecting electrode through said first impedance means.

References Cited

UNITED STATES PATENTS

| | | | |
|---|---|---|---|
| 2,282,870 | 5/1942 | Lundie | 330—94 |
| 2,313,097 | 3/1943 | Shepard | 330—149X |
| 3,064,203 | 11/1962 | Wilbur et al. | 330—149X |
| 3,389,344 | 6/1968 | Fichtner | 330—19 |

ROY LAKE, *Primary Examiner*

J. B. MULLINS, *Assistant Examiner*.

U.S. Cl. X.R.

330—40